(12) United States Patent
Benkreira et al.

(10) Patent No.: US 11,580,549 B2
(45) Date of Patent: Feb. 14, 2023

(54) TRANSACTION TRACKING AND FRAUD DETECTION USING VOICE AND/OR VIDEO DATA

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/749,573

(22) Filed: Jan. 22, 2020

(65) Prior Publication Data

US 2021/0224810 A1 Jul. 22, 2021

(51) Int. Cl.
*G06N 20/00* (2019.01)
*G06Q 20/40* (2012.01)

(52) U.S. Cl.
CPC ......... *G06Q 20/4016* (2013.01); *G06N 20/00* (2019.01)

(58) Field of Classification Search
CPC .......................... G06Q 20/4016; G06N 20/00
USPC .......................................................... 705/44
See application file for complete search history.

(56) References Cited

U.S. PATENT DOCUMENTS

| | | | |
|---|---|---|---|
| 2007/0269025 A1* | 11/2007 | Shieh | H04M 3/42221 379/67.1 |
| 2008/0055427 A1 | 3/2008 | Wendelrup | |
| 2014/0222678 A1* | 8/2014 | Sheets | G10L 17/00 705/44 |
| 2015/0142596 A1* | 5/2015 | Jakobson | G06Q 20/206 705/24 |
| 2017/0118207 A1* | 4/2017 | Madhu | G06V 10/95 |
| 2017/0186011 A1* | 6/2017 | Lieberman | G06Q 20/40145 |
| 2018/0082286 A1* | 3/2018 | DeLuca | G06Q 20/40145 |
| 2019/0347117 A1* | 11/2019 | Vaughn | G06F 16/5866 |

* cited by examiner

*Primary Examiner* — Jessica Lemieux
*Assistant Examiner* — Merritt J Hasbrouck
(74) *Attorney, Agent, or Firm* — Harrity & Harrity, LLP

(57) ABSTRACT

A device receives recording data, for a recording of a user associated with an account, that captures the user describing a transaction. The device processes the recording data to identify one or more characteristics of an individual that described the transaction in the recording. The device determines, based on the one or more characteristics of the individual, whether the individual that described the transaction in the recording is the user associated with the account. The device causes the recording data to be stored in association with transaction data that identifies a list of transactions that are associated with the account of the user, wherein causing the recording data to be stored in association with the transaction data allows the recording to be made accessible to the user via an interface of an application used to manage the account.

20 Claims, 10 Drawing Sheets

140
Identify one or more characteristics of an individual that is describing the transaction in the recording
Example Characteristics of Individual
- Voice Features
- Facial Features
Transaction Management Platform
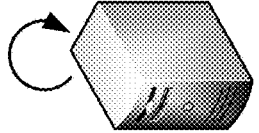
145
Determine whether the individual that is describing the transaction is the user that has the account
Transaction Management Platform
FIG. 1C

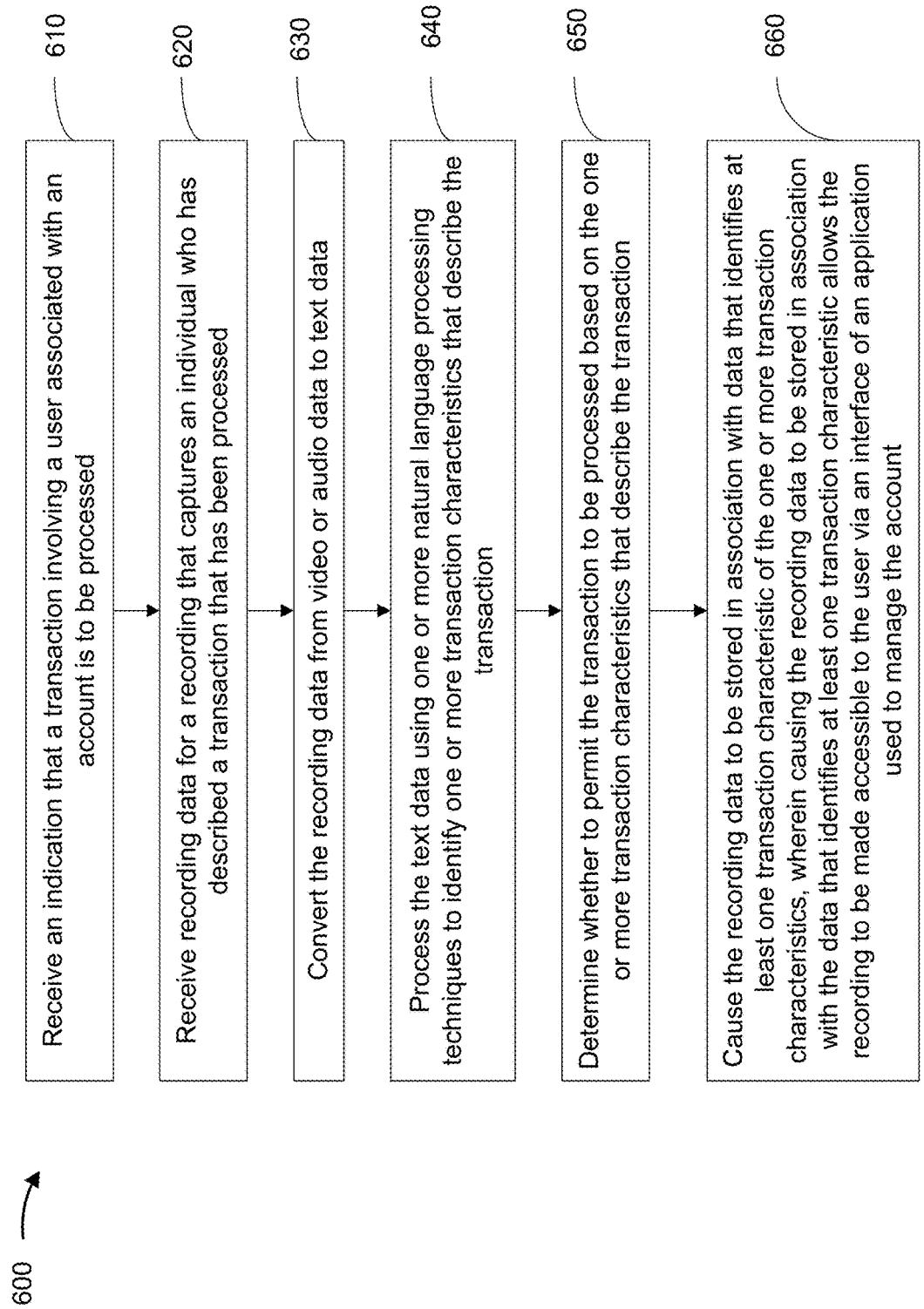

TRANSACTION TRACKING AND FRAUD DETECTION USING VOICE AND/OR VIDEO DATA

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some implementations, a method may include receiving an indication that a transaction involving a user associated with an account is to be processed. The method may include receiving recording data for a recording of the user while the user is describing the transaction. The recording may have been created prior to the transaction being processed. The method may include determining whether the individual that has described the transaction is the user associated with the account. The method may include determining whether to permit the transaction to be processed based on whether the individual that described the transaction is the user associated with the account. The method may include causing the recording data to be stored in association with transaction data that identifies a list of transactions that are associated with the account of the user. Causing the recording data to be stored in association with the transaction data may allow the recording to be made accessible to the user via an interface of an application used to manage the account.

According to some implementations, a device may include one or more memories, and one or more processors, communicatively coupled to the one or more memories, configured to: receive an indication that a transaction involving a user associated with an account is to be processed. The one or more processors may receive recording data, for a recording of a user associated with an account, that captures the user describing a transaction. The one or more processors may process the recording data to identify one or more characteristics of an individual that described the transaction in the recording. The one or more processors may determine, based on the one or more characteristics of the individual, whether the individual that described the transaction in the recording is the user associated with the account. The one or more processors may cause the recording data to be stored in association with transaction data that identifies a list of transactions that are associated with the account of the user. The recording data may be associated with the transaction data based on determining that the individual that described the transaction in the recording is the user associated with the account. Causing the recording data to be stored in association with the transaction data may allow the recording to be made accessible to the user via an interface of an application used to manage the account.

According to some implementations, a non-transitory computer-readable medium may store one or more instructions. The one or more instructions, when executed by one or more processors of a device, may cause the one or more processors to receive an indication that a transaction involving a user associated with an account is to be processed. The one or more instructions may cause the one or more processors to receive recording data for a recording that captures an individual who has described a transaction that has been processed. The one or more instructions may cause the one or more processors to convert the recording data from video or audio data to text data. The one or more instructions may cause the one or more processors to process the text data using one or more natural language processing techniques to identify one or more transaction characteristics that describe the transaction. The one or more instructions may cause the one or more processors to determine whether to permit the transaction to be processed based on the one or more transaction characteristics that describe the transaction. The one or more instructions may cause the one or more processors to cause the recording data to be stored in association with the data that identifies at least one transaction characteristic of the one or more transaction characteristics. Causing the recording data to be stored in association with the data that identifies at least one transaction characteristic may allow the recording to be made accessible to the user via an interface of an application used to manage the account.

BRIEF DESCRIPTION OF THE DRAWINGS

FIGS. 1A-1E are diagrams of one or more example implementations described herein.

FIGS. 4-6 are flowcharts of one or more example processes for using voice and/or video data to determine whether to permit a transaction to be processed.

DETAILED DESCRIPTION

Figure 1A:
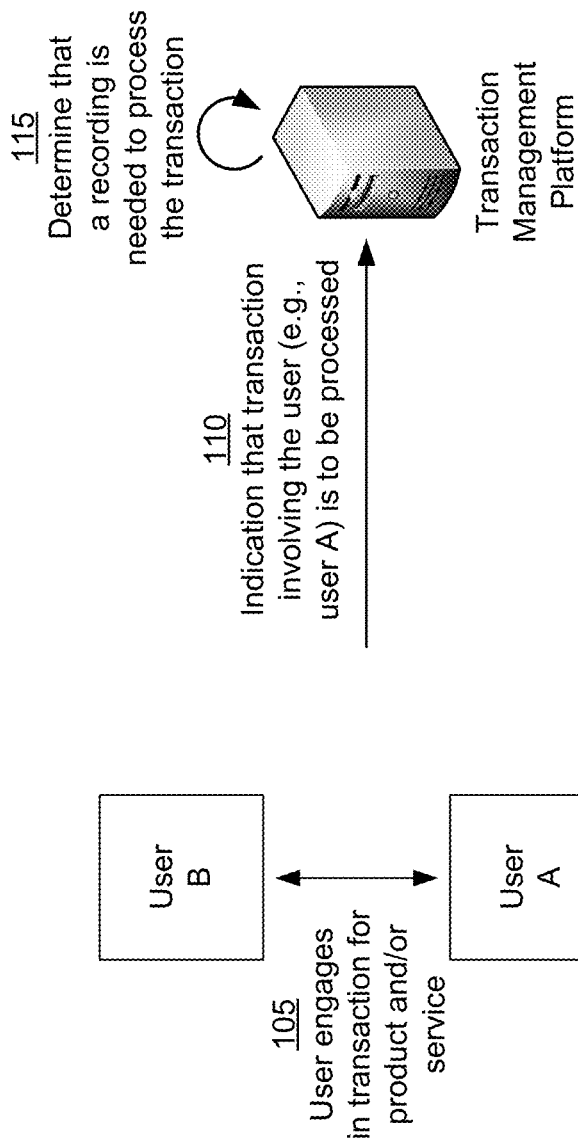

The following detailed description of example implementations refers to the accompanying drawings. The same reference numbers in different drawings may identify the same or similar elements.

In the digital age, individuals are having an increasingly difficult time managing and tracking transactions. For example, a transaction card (e.g., a debit card, a credit card, and/or the like) allows an individual to engage in transactions without the need to carry cash. This has created a "swipe" culture, whereby an individual may swipe his or her transaction card numerous times throughout the day, without paying attention to specific details relating to the transaction (e.g., a transaction amount, whether the individual was given a receipt, and/or the like). Furthermore, individuals that have memory related issues may have an especially difficult time managing and tracking transactions. For example, an elderly individual may have diminishing memory and may not remember engaging in a transaction, an individual may have a disease that impacts memory and therefore makes it difficult to remember engaging in a transaction, and/or the like.

In some cases, an application used to manage an account of the individual (e.g., an online banking application) may be used to keep track of the transactions. However, a server device (e.g., that supports the online banking application) may present the individual with inaccurate transaction data and/or may be unable to efficiently and/or effectively assist the individual in managing and tracking the transactions. For example, if the individual is charged an incorrect amount by a merchant, the online banking application may only display the incorrect amount that the individual was charged (e.g., in association with a transaction identifier that identifies the transaction). Additionally, a record of the incorrect amount charged may be insufficient to alert the individual as to whether the correct price was paid (e.g., an amount agreed on when the individual engaged in the transaction), may be insufficient to prove that the transaction is fraudulent, and/or the like.

Some implementations described herein provide a transaction management platform to assist a user in creating and storing a diary-like recording that captures audio and/or video of the user at a time when the user is describing a transaction. In some implementations, the transaction management platform may cause the recording data to be stored in association with transaction data that identifies a list of transactions that are associated with the account of the user. In some implementations, the recording may be made available to the user via an interface of an application used to manage the account (referred to herein as a transaction management tool).

Additionally, or alternatively, some implementations described herein provide for the transaction management platform to determine whether to permit the transaction to be processed based on the recording. For example, if the recording is received prior to the user completing the transaction, the transaction management platform may analyze the recording to determine whether an individual identified in the recording is an authorized user (e.g., the user that has the account, is authorized to use or manage the account, and/or the like) and/or to determine a level of risk associated with the transaction. This may allow the transaction management platform to determine whether to permit the transaction to be processed based on whether the individual identified in the recording is the authorized user and/or based on the determined level of risk associated with the transaction. As used herein, a user may refer to a user that has an account, a named user on the account, a user authorized to use the account, a user authorized to manage the account, a trustee of the account, and/or the like.

In this way, the transaction management platform provides the user with a mechanism for efficiently and/or effectively managing and/or tracking the transaction. For example, by verifying that the individual identified in the recording is in fact the authorized user, the transaction management platform reduces a risk of the user falling victim to fraud, conserves resources of one or more other devices (e.g., processing resources, network resources, memory resources, and/or the like) that might otherwise be wasted performing fraud correction tasks, and/or the like. Additionally, by storing the recording data for the recording, the transaction management platform creates a verifiable way for the user to prove which transaction terms were agreed on at a time when the user engaged in the transaction, a verifiable way for the user to prove whether particular transaction terms were agreed on, and/or the like.

FIGS. 1A-1E are diagrams of one or more example implementations 100 described herein. Example implementation(s) 100 may include a user device and a transaction management platform. As shown in FIGS. 1A-1E, the user device may generate and provide, to the transaction management platform, a diary-like recording that captures audio and/or video of a user while the user is describing a transaction. This may allow the transaction management platform to determine, based on the recording, whether to permit the transaction to be processed.

While one or more implementations described herein refer to using the recording to determine whether to permit a transaction to be processed, it is to be understood that this is provided by way of example. In practice, the recording may be generated, stored, and used for one or more other purposes. For example, the recording may be used to verify the transaction independently of the transaction being processed (e.g., verification may occur before the user engages in the transaction or after the transaction has been completed), the recording may be made accessible to the user via a transaction management tool that is used to manage an account that the user has with a financial institution, and/or the like.

As shown in FIG. 1A, and by reference number 105, the user (shown as User A) may engage in the transaction with another user (shown as User B). The transaction may be a transaction for a product and/or a service.

In some implementations, the user may have an account with a financial institution. In some implementations, the user may have access to an application (referred to hereafter as a transaction management tool) that may be used to manage the account. The transaction management tool may be a web application, a mobile application, a desktop application, and/or the like. The transaction management tool may include one or more features that may allow the user to upload a recording, to download a recording, to listen to and/or to view a recording, to view a recording in association with transaction data and/or account data, and/or the like, as will be described further herein.

As shown by reference number 110, the transaction management platform may receive an indication that the transaction involving the user is to be processed. For example, the transaction management platform may receive an indication that the transaction is to be processed from the user device, from a merchant server, from a bank server associated with the financial institution, from an application server that hosts and/or supports the transaction management tool, and/or the like. The indication may be a message that includes a transaction identifier that identifies the transaction, a transaction type identifier that identifies a type of transaction, time data that identifies a time stamp, a merchant identifier for a merchant involved in the transaction with the user, a user identifier for the user, transaction product and/or service data that identifies a product and/or service associated with the transaction, transaction amount data that identifies an amount of the transaction, and/or the like.

In some implementations, the transaction management platform may receive the indication based on the user attempting to process a payment for the transaction for the product and/or the service. For example, the user may attempt to process the payment for the transaction by swiping a transaction card, by completing an online purchasing procedure, and/or the like. In this case, when the user attempts to process the payment, the merchant server and/or the application server may cause the indication to be provided to the transaction management platform.

As shown by reference number 115, the transaction management platform may determine that the recording is needed to process the transaction. For example, certain conditions may be satisfied that may require the user to create and/or to upload a recording that describes the transaction before one or more bank servers may process the transaction. To determine whether the recording is needed to process the transaction, the transaction management platform may determine whether one or more conditions, of a set of conditions, are satisfied.

In some implementations, the set of conditions may include a first condition specifying that a recording is needed for a transaction to be processed based on an amount of the transaction satisfying a threshold amount, a second condition specifying that a recording is needed for a transaction to be processed based on a user preference of the user (and/or a preference of a trustee that assists in managing the account of the user), and/or the like. Additionally, or alternatively, the set of conditions may include a third condition specifying that a recording is needed for a transaction to be processed based on a product and/or service identified in the transaction being a particular product and/or service that has been linked to previously identified fraudulent transactions, a fourth condition specifying that a recording is needed for a transaction to be processed based on a party to the transaction (e.g., a merchant, another user, and/or the like) being identified as being involved in previously identified fraudulent transactions, and/or the like.

As an example, the transaction management platform may determine that the first condition is satisfied based on an amount of the transaction exceeding a threshold amount. The first condition may be configured because larger transactions are inherently riskier and therefore may be better suited for requiring the user to create recordings before the larger transactions may be processed. In this example, the transaction management platform may compare the transaction amount data that identifies the amount of the transaction with threshold transaction amount data to determine whether the recording is needed to process the transaction.

Additionally, or alternatively, and provided as another example, the transaction management platform may determine that the second condition is satisfied based on a user preference specifying that recording is needed to process the transaction. In this example, the transaction management platform may, by using the user identifier to reference a data structure that stores user preferences data, determine whether the user has a preference that will require the recording before processing the transaction, such as a preference to always require a recording before processing the transaction, a preference to require a recording based on one or more other conditions being satisfied, and/or the like. In some cases, one or more user preferences for the user may be configured by a trustee that has authority to review transactions on behalf of the user.

It is to be understood that these conditions are provided by way of example, and that in practice, any number of conditions and/or rules may be configured. For example, the transaction management platform may be configured to require a recording for all transactions involving the user, may be configured to require a recording for a transaction based on a geographic location of the user's mobile device at a time when the transaction is requesting to be processed, and/or the like.

In some implementations, the transaction management platform may determine whether one or more other conditions are satisfied using a first data model that has been trained using machine learning. For example, the transaction management platform may have trained a first data model or may have access to a trained first data model that can generate a risk score that indicates a likelihood of the transaction being a legitimate (or fraudulent) transaction. This may allow the transaction management platform to determine whether the recording is needed for the transaction to be processed based on the risk score.

In some implementations, the first data model may have been trained to identify one or more trends that serve as indicators that affect a likelihood of a particular transaction being fraudulent (or legitimate). For example, the one or more trends may include a first trend that indicates that a particular merchant is linked to a threshold quantity of fraudulent transactions, a second trend that indicates that a particular type of product and/or service is linked to a threshold quantity of fraudulent transactions, and/or the like.

To use the first data model, the transaction management platform may provide, as input to the first data model, transaction data for the transaction, account data associated with the account of the user, and/or the like (collectively referred to as input data). This may cause the first data model to process the input data to generate a risk score that represents a likelihood of the transaction being fraudulent (or legitimate). This may allow the transaction management platform to determine, based on the risk score, whether the recording is needed to process the transaction. For example, the transaction management platform may compare the risk score with a threshold risk score and may determine whether the recording is needed to process the transaction based on the comparison.

In this way, the transaction management platform determines whether the recording is needed to process the transaction.

Figure 1B:
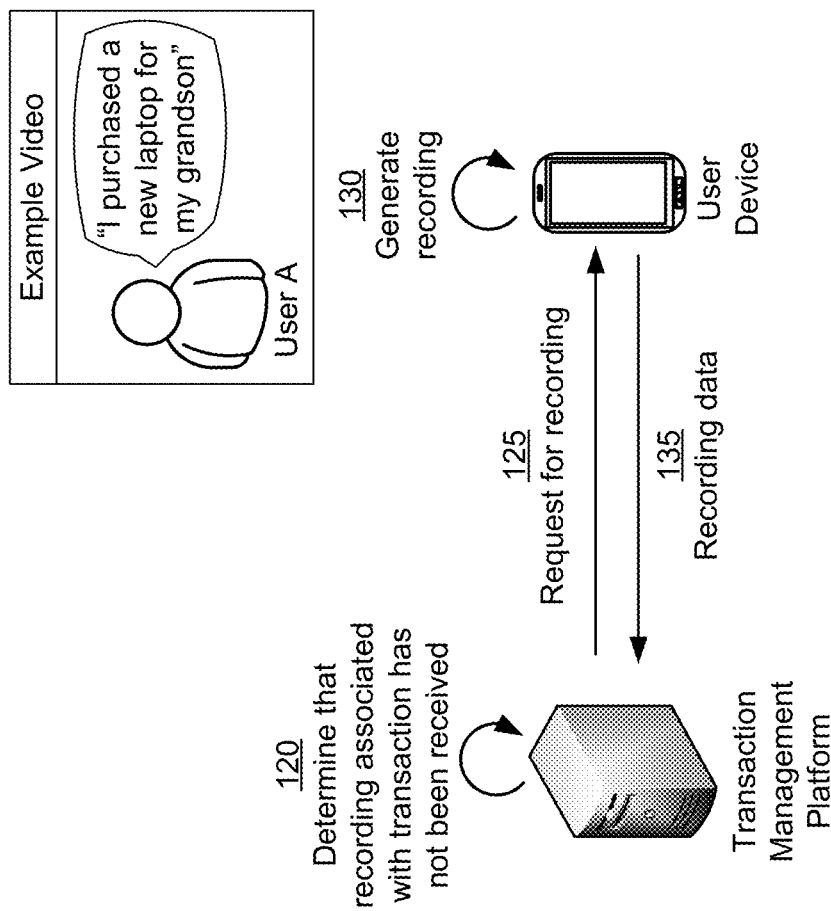

As shown in FIG. 1B, and by reference number 120, the transaction management platform may determine that the recording associated with the transaction has not been received. For example, the transaction management platform may, based on determining that the recording is needed to process the transaction, reference a data structure that is used to map recordings and user identifiers for a group of users. In this case, the transaction management platform may use a user identifier of the user to reference a set of recordings that are linked to the account of the user and may determine that the recording has not been received based on an identifier (e.g., a transaction identifier, a time stamp, and/or the like), which corresponds to the transaction, not matching with a corresponding identifier that is stored via the data structure.

As shown by reference number 125, the transaction management platform may cause a request for the recording to be provided to the user device. For example, the transaction management platform may cause a request for the recording to be provided for display via one or more interfaces of the transaction management tool (e.g., which may be accessed via the user device). The request may include instructions that specify what the user is to include in the recording, such as instructions to create a recording that specifies a transaction amount, one or more parties involved in the transaction, a product and/or service being exchanged in the transaction, a reason for engaging in the transaction, and/or the like.

In some implementations, the transaction management platform may provide the request to the application server that supports the transaction management tool. For example, the transaction management platform may provide the request to the application server over a communication interface, such as an application programming interface (API) and/or another type of communication interface. This may allow the application server to make the recording downloadable via the one or more interfaces of the transaction management tool, to allow the recording to be played via the one or more interfaces, and/or the like.

In some implementations, the transaction management platform may provide the request to the user device. For example, if the user device is a mobile phone, the transaction management platform may provide the request to the user device via a text message, via an automated phone call, via a pop-up notification associated with the transaction management tool (e.g., via a pop-up message), and/or the like. In some implementations, the user device may use a plug-in for a web browser to receive the request from the transaction management platform.

In some implementations, the transaction management platform may cause the request to be provided to one or more other devices and/or applications associated with the user. For example, the transaction management platform may cause the request to be sent to an e-mail account linked to the user, may cause the request to be provided to a device or account associated with a trustee of the user (e.g., who has legal authority to make financial decisions on behalf of the user), and/or the like.

As shown by reference number 130, the user device may generate the recording. For example, the user may interact with a camera component of the user device to create an audio recording, a video recording, and/or the like. The recording may include an audio of a voice of the user while the user is describing one or more transaction characteristics of the transaction, a video of the user depicting the user while the user is describing the one or more transaction characteristics, and/or the like. The one or more transaction characteristics may include a characteristic that identifies a price for a product or service being exchanged via the transaction, a characteristic that identifies a merchant identifier for a merchant associated with the product or service, a characteristic that identifies a product or service identifier for the product or service, a characteristic that identifies a reason for participating in the transaction, a characteristic that identifies a warranty and/or a return policy associated with the product or service, and/or the like.

As shown by reference number 135, the user device may cause recording data, for the recording, to be made available to the transaction management platform. For example, the user may interact with an interface of the transaction management tool to upload the recording to the transaction management tool. In this case, the application server may provide the recording data to the transaction management platform (e.g., via a communication interface such as an API or another type of interface).

In this way, the transaction management platform receives the recording data for the recording.

As shown in FIG. 1C, and by reference number 140, the transaction management platform may identify one or more characteristics of an individual that is describing the transaction in the recording. For example, the transaction management platform may identify one or more characteristics of an individual that is describing the transaction in the recording and may use the identified one or more characteristics to verify whether the individual that is describing the transaction in the recording is an authorized user (e.g., the user that has the account with the financial institution or is otherwise authorized to use or manage the account, such as a trustee or the like). In this case, the transaction management platform may identify the one or more characteristics of the individual by processing the recording data using one or more computer vision techniques, using one or more speaker recognition techniques, and/or the like. The one or more characteristics of the individual may include a set of voice-related characteristics of the individual, a set of physical characteristics of the individual (e.g., a set of facial characteristics, a gesture made by the individual, and/or the like), and/or the like. In some aspects, characteristic(s) of an authorized user may be obtained and/or stored prior to receiving the recording, such that those characteristic(s) can be compared to characteristic(s) in the recording to determine whether the user identified from the recording is an authorized user.

Although some implementations are described herein as verifying whether the individual that is describing the transaction in the recording is an authorized user, in some implementations, such verification may be performed without using characteristics identified from the recording. For example, the user may be verified based on credentials input to an application associated with creating the recording, based on biometric information, and/or the like.

In some implementations, the transaction management platform may identify one or more characteristics of the individual by using the one or more computer vision techniques to process video data of the recording. The one or more computer vision techniques may include a facial recognition technique, an image classification technique, an object detection technique, a semantic segmentation technique, an OCR technique, and/or the like. As an example, the transaction management platform may process a set of frames of the video data using the facial recognition technique to identify a face of the individual, a set of facial characteristics associated with the face of the individual, such as a color of the individuals eyes, dimensions of the individual's nose, mouth, ears, and/or eyes, other distinguishable facial characteristics of the individual (e.g., a piercing, an earring, and/or the like), and/or the like.

In some implementations, the transaction management platform may identify the one or more characteristics of the individual by using the one or more speaker recognition techniques to process audio data of the recording. For example, the transaction management platform may use the one or more speaker recognition techniques to process the audio data to identify a set of voice-related characteristics, such as one or more characteristics relating to a tone of the individual's voice (e.g., a tone at a particular time, a tone range over time, and/or the like), one or more characteristics relating to a pitch of the individual's voice (e.g., a pitch at a particular time, a pitch range over time, and/or the like), and/or the like.

In some implementations, the transaction management platform may format the recording. For example, the transaction management platform may remove a portion of the recording, condense a portion of the recording, and/or the like. In some cases, a forgetful individual might forget to press the stop button while creating the recording. In these cases, the transaction management platform may remove a portion of the recording that does not include the individual's voice and/or that does not include video data that identifies the individual. In this way, the transaction management platform reduces a utilization of resources needed to continue processing the recording (e.g., relative to not formatting the recording).

As shown by reference number 145, the transaction management platform may determine whether the individual that is describing the transaction is an authorized user. For example, the transaction management platform may determine whether the individual that is describing the transaction in the recording is an authorized user or the user that has the account based on whether the one or more characteristics of the individual satisfy a threshold level of similarity with one or more corresponding characteristics of the user that has the account. In some implementations, the transaction management platform may have access to a data structure used to store data that identifies the one or more corresponding characteristics of the user. For example, the user may have provided voice data and/or video data of the user speaking and/or making particular gestures when registering for the account, after registering for the account, and/or the like. The transaction management platform may perform one or more actions based on whether the individual that is describing the transaction is the user that has the account, as will be described in connection with FIGS. 1D and 1E.

To provide a few examples, the transaction management platform may compare a first dataset that identifies the set of facial characteristics of the individual with a second dataset that identifies a corresponding set of facial characteristics of the user that has the account, may compare a third dataset that identifies the set of voice-related characteristics of the individual with a fourth dataset that identifies a corresponding set of voice-related characteristics of the user that has the account, and/or the like. The second and fourth datasets may be stored using a data structure in a manner that allows the data to be queried by the transaction management platform. The transaction management platform may determine whether the individual that is describing the transaction in the recording is the user that has the account based on whether the first dataset satisfies a threshold level of similarity with the second dataset, based on whether the third dataset satisfies a threshold level of similarity with the fourth dataset, and/or the like.

In some implementations, the transaction management platform may use machine learning to determine whether the individual that is describing the transaction is the user that has the account. For example, the transaction management platform may have trained a second data model using one or more machine learning techniques, such that the second data model can compare the data that identifies the one or more characteristics of the individual with the one or more corresponding characteristics of the user and can output a similarity score that indicates a likelihood of the individual being the user that has the account.

In some implementations, the transaction management platform may train the second data model. For example, the transaction management platform may process historical data using one or more machine learning techniques, such that the second data model is able to receive data that identifies characteristics of two (or more) different individuals (e.g., the user that has the account and an individual identified in a recording) and is able to output a similarity score that indicates the likelihood of the individual being the user that has the account. The one or more machine learning techniques may include a regression technique, a clustering technique, a technique using a neural network, and/or the like. In some implementations, the transaction management platform may receive a trained second data model (e.g., from another device).

In some implementations, the transaction management platform may use the trained second data model to determine whether the individual that is describing the transaction in the recording is the user that has the account. For example, the transaction management platform may provide, as input to the second data model, the data that identifies the one or more characteristics of the individual and the data that identifies the one or more corresponding characteristics of the user that has the account. This may cause the second data model to generate a similarity score. In this case, the transaction management platform may use the similarity score to determine whether the individual that is describing the transaction in the recording is the user that has the account (e.g., based on whether the similarity score satisfies a threshold level of similarity).

In some implementations, the transaction management platform may use the trained second data model to determine whether the individual that is describing the transaction in the recording is a trustee or another authorized user of the account. For example, the transaction management platform may provide, as input to the second data model, the data that identifies the one or more characteristics of the individual and data that identifies the one or more corresponding characteristics of the trustee or the other authorized user of the account. This may cause the second data model to generate a similarity score. In this case, the transaction management platform may use the similarity score to determine whether the individual that is describing the transaction in the recording is the trustee or the other authorized user of the account (e.g., based on whether the similarity score satisfies a threshold level of similarity).

In some implementations, the trustee may verify whether the individual that is describing the transaction in the recording is the user that has the account. For example, the recording may be provided to a user device associated with a trustee that has legal authority to make financial decisions on behalf of the user and/or to assist the user in making financial decisions. In this case, the trustee may interact with an interface of the user device to verify whether the individual that is describing the transaction in the recording is the user that has the account. This may cause verification data that indicates a result of the verification to be provided to the transaction management platform. In this way, the transaction management platform reduces a utilization of resources (e.g., processing resources, memory resources, and/or the like) relative to having to store and compare data used to perform the verification.

In this way, the transaction management platform determines whether the individual that is describing the transaction in the recording is the user that has the account. Furthermore, by verifying that the individual identified in the recording is in fact the user that has the account, the transaction management platform reduces risk of the transaction being fraudulent, conserves resources of one or more other devices (e.g., processing resources, network resources, memory resources, and/or the like) that might otherwise be wasted performing fraud correction tasks. Additionally, the transaction management platform reduces a utilization of resources in situations where the individual that is describing the transaction is identified as not being the user that has the account. For example, if the transaction management platform determines that the individual is not the user that has the account, the transaction management platform may refrain from performing one or more processing actions described in connection with FIG. 1D, thereby reducing a utilization of resources (relative to performing the one or more processing actions).

Figure 1D:
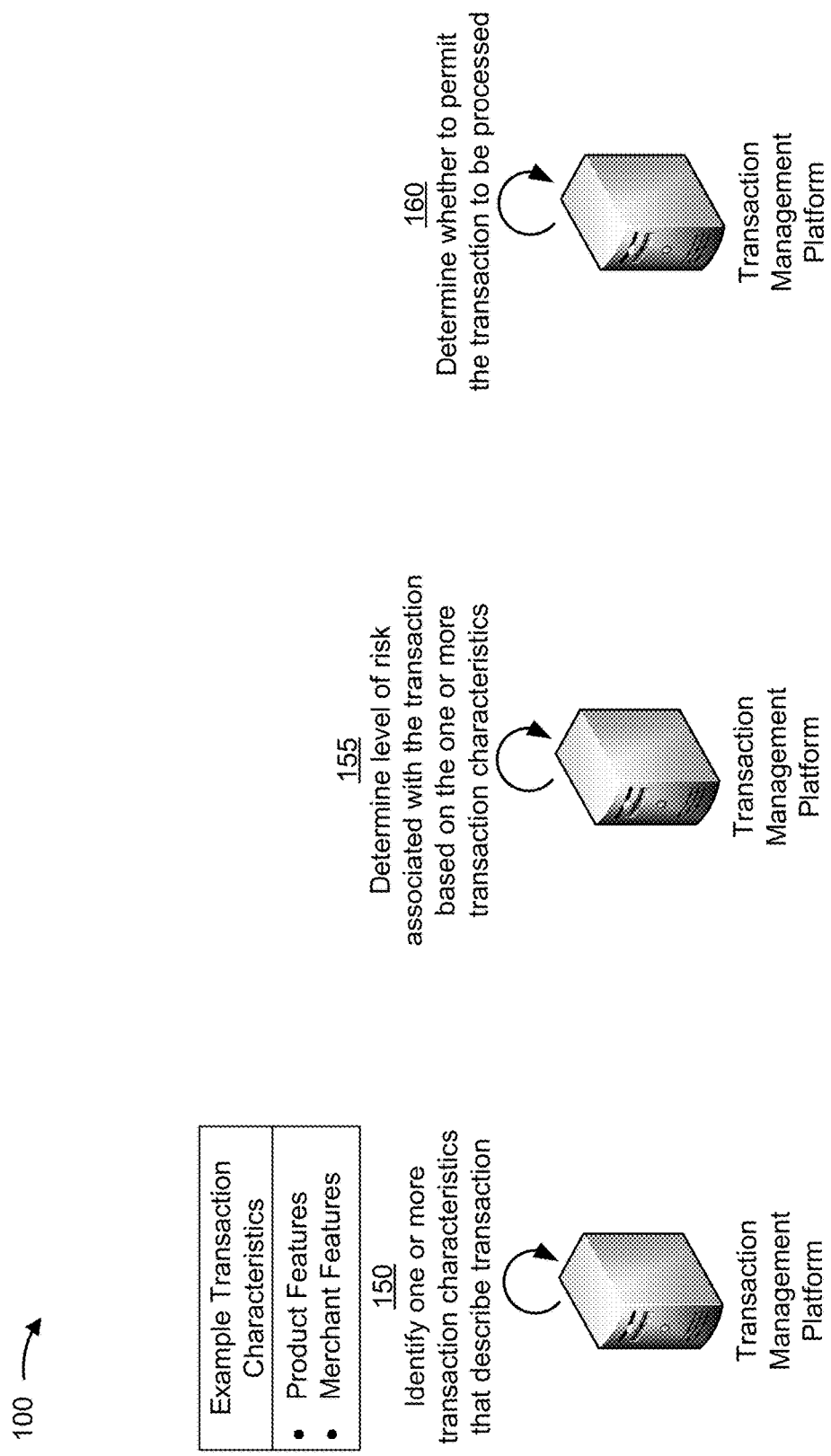

As shown in FIG. 1D, and by reference number 150, the transaction management platform may identify one or more transaction characteristics that describe the transaction. For example, the transaction management platform may identify one or more transaction characteristics by converting the recording data from audio and/or video data to text data and by processing the text data using one or more natural language processing techniques. The one or more transaction characteristics are defined in connection with FIG. 1B.

In some implementations, the transaction management platform may use the one or more natural language processing techniques to process the text data to identify specific words spoken by the individual, specific phrases spoken by the individual, a meaning of those words and/or phrases, and/or the like. For example, the transaction management platform may use the one or more natural language processing techniques to identify a product or service associated with the transaction, a price for the product or service, a merchant involved in the transaction with the user, and/or the like. The one or more natural language processing techniques may include one or more syntax-based techniques (e.g., a parsing technique, a lemmatization technique, a stemming technique, a word segmentation technique, and/or the like), one or more semantic-based techniques (e.g., a graph-based technique, a lexical semantics technique, and/or the like), and/or the like.

In some implementations, the transaction management platform may identify one or more missing transaction characteristics that are not identified in the recording. For example, a data structure may store a list of one or more required transaction characteristics in association with a transaction type identifier. This may allow the transaction management platform to compare the one or more identified transaction characteristics with the list of the one or more required transaction characteristics to identify one or more missing transaction characteristics that are not identified in the recording. In some implementations, the transaction management platform may perform one or more actions based on identifying the one or more missing transaction characteristics. For example, the transaction management platform may cause the user device to display a message indicating that a new recording is to be made, to display a message indicating that the user is to submit a supplemental recording that includes the one or more missing transaction characteristics, and/or the like. In this way, the transaction management platform ensures that the user is creating recordings that include sufficient information that may be useful (and/or needed) for subsequent verification and/or review of the transaction.

As shown by reference number 155, the transaction management platform may determine a level of risk associated with the transaction based on the one or more transaction characteristics. For example, the transaction management platform may train a third data model, using machine learning, that is capable of processing transaction data that identifies transaction characteristics to determine one or more risk scores that represent likelihoods of a particular transaction being fraudulent.

In some implementations, the transaction management platform may train the third data model. For example, the transaction management platform may process historical data, using a set of feature identification techniques, to identify a set of features that may be used to train the third data model. The historical data may include historical transaction data for transactions associated with the user, historical transaction data for transactions associated with a group of users that have accounts with one or more financial institutions, historical merchant review data that identifies one or more reviews of a merchant (e.g., a review made by a user that has engaged in a transaction with the merchant, a review that assigns the merchant an overall credibility score based on a series of transactions (e.g., a review by the Better Business Bureau (BBB)), and/or the like), and/or the like. The set of feature identification techniques may include using a technique that involves text mining and latent semantic analysis (LSA), a trend variable analysis technique, an interest diversity analysis technique, a technique using a neural network, a composite indicators analysis technique, a clustering technique, a regression technique, and/or the like.

In this case, the transaction management platform may analyze the historical data by using the set of feature identification techniques to identify one or more features that impact a likelihood of a transaction being a legitimate transaction, one or more features that impact a likelihood of a transaction being an illegitimate transaction, and/or the like. To provide a specific example, a merchant that is repeatedly linked to illegitimate transactions may, over time, receive an increasing number of negative customer reviews, may have a steadily declining BBB approval score, may have a threshold quantity of charge-back requests and/or complaints filed against the merchant, and/or the like. In these cases, the transaction management platform may identify, as part of the set of features, that future transactions with this particular merchant are more likely to be illegitimate transactions (relative to other merchants that do not have a steadily increasing number of negative customer reviews, that do not have a steadily declining BBB approval score, and/or the like).

To provide another example, a user may participate in transactions that are within a particular price range. For example, an elderly person may, over the course of a given year, engage in transactions between $1.00 and $500. In this case, the transaction management platform may process historical transaction data for the user and may identify, as part of the set of features, the dollar value range for the transactions that the user has engaged in, such that transactions within the range may increase a likelihood of the transactions being legitimate transactions, transactions outside of the range (or within a threshold amount outside of the range) may increase a likelihood of the transactions being illegitimate transactions, and/or the like.

In some implementations, the transaction management platform may train the third data model based on the set of features. For example, the transaction management platform may train a neural network that has an input layer, one or more intermediate layers (e.g., a fully connected layer, a convolutional layer, a pooling layer, a recurrent layer, and/or the like), and an output layer. In this case, the set of features may be hyperparameters that are used as part of a cost function of the neural network. Additionally, the transaction management platform may perform a feedforward technique to provide particular transaction characteristic values and/or merchant review data values (e.g., that are part of a test dataset) as input to the neural network, and the neural network may output one or more risk scores that represent, based on the particular transaction characteristic values and/or the merchant review data values, a level of risk associated with the transaction, a likelihood of a particular transaction being a legitimate or illegitimate transaction, and/or the like. Furthermore, the transaction management platform may compare the one or more risk scores to known values and may determine an error value based on the comparison. The error value may be used to update the cost function (e.g., which may assign weights to particular features of the set of features), and the transaction management platform may perform a backpropagation technique to iteratively train the neural network until a threshold level of accuracy has been reached.

To use the third data model, the transaction management platform may first obtain real-time (or near real-time) merchant review data. For example, the transaction management platform may obtain merchant review data by making one or more API calls to data storage devices that store the merchant review data. In this case, the transaction management platform may provide the one or more identified transaction characteristics and/or the merchant review data as input to the third data model. This may cause the third data model to output the one or more risk scores that represent a particular level of risk associated with the transaction, that represent a likelihood of the transaction being a legitimate (or illegitimate) transaction, and/or the like.

As shown by reference number 160, the transaction management platform may determine whether to permit the transaction to be processed. For example, the transaction management platform may determine whether to permit the transaction to be processed based on whether the individual is the user that has the account and/or based on the one or more risk scores. In some implementations, the transaction management platform may determine to permit the transaction to be processed based on determining that the individual is the user that has the account and/or based on determining that the one or more risk scores satisfy the one or more threshold risk scores.

In some implementations, the transaction management platform may determine to permit the transaction to be processed based on the one or more risk scores corresponding to a first level of risk. Additionally, or alternatively, the transaction management platform may, based on the one or more risk scores corresponding to a second level of risk, provide a device associated with a trustee of the user with a notification that the trustee is to review the transaction. The trustee may be an individual that has legal authority to engage in a transaction on behalf of the user, to authorize a transaction on behalf of the user, to review a transaction on behalf of the user, and/or the like. In this example, the transaction management platform may determine whether to permit the transaction to be authorized based on receiving an indication that the trustee has reviewed (and/or approved) the transaction. Additionally, or alternatively, the transaction management platform may prevent the transaction from being processed based on the one or more risk scores corresponding to a third level of risk.

Additionally, or alternatively, the transaction management platform may determine whether to permit the transaction to be processed based on determining whether the user device is linked to the account of the user. For example, the transaction management platform may identify a device identifier associated with the user device used to generate the recording. In this case, the transaction management platform may determine, based on the device identifier, whether the user device used to generate the recording is linked to the account of the user. For example, the transaction management platform may compare the device identifier with stored device identifiers of users (e.g., as may be stored by a data structure) and may determine whether the user device is linked to the account of the user based on the comparison. If the user device is linked to the account, the transaction management platform may determine to permit the transaction to be processed. If the user device is not linked to the account, the transaction management platform may prevent the transaction from being processed, may perform additional security checks (e.g., such as reaching out to the trustee of the user to request verification of the individual in the recording), and/or the like.

It is to be understood that the risk levels described above are provided by way of example. In practice, any number of different risk levels may be implemented and any number of different types of actions may be configured.

In this way, the transaction management platform efficiently and/or effectively determines whether to permit the transaction to be processed. By making the determination based on verifying that the individual identified by the recording is the user that has the account and based on the level of risk associated with the transaction, the transaction management platform reduces a risk of the transaction being fraudulent, thereby conserving resources that one or more other devices might waste performing particular fraud correction tasks.

Figure 1E:
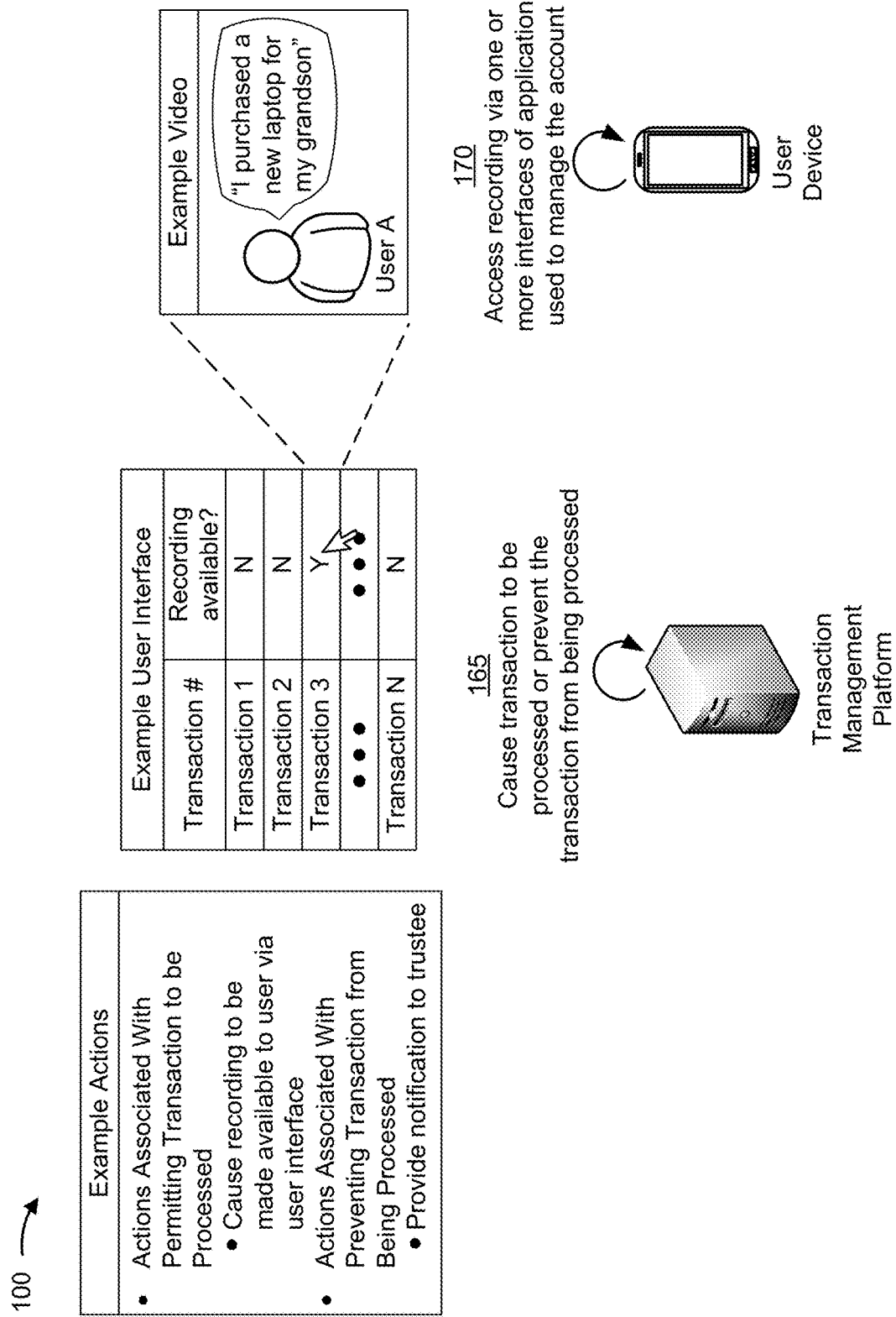

As shown in FIG. 1E, and by reference number 165, the transaction management platform may cause the transaction to be processed or may prevent the transaction from being processed. In some implementations, the transaction management platform may cause the transaction to be processed. For example, the transaction management platform may determine to permit the transaction to be processed based on determining that the individual that is describing the transaction in the recording is the user that has the account and based on determining that the one or more risk scores satisfy the one or more threshold risk scores, and/or the like. In this case, the transaction management platform may then provide, to one or more bank servers associated with the financial institution, an indication that the transaction is to be processed. This may allow the one or more bank servers to process the transaction (e.g., by charging the user with an agreed upon transaction amount, by deducting that amount from a balance associated with the account, and/or the like).

In some implementations, the transaction management platform may prevent the transaction from being processed. For example, the transaction management platform may determine to prevent the transaction from being processed based on determining that the individual that is describing the transaction in the recording is not the user that has the account, based on the one or more risk scores failing to satisfy the one or more threshold risk scores, and/or the like. In this case, the transaction management platform may then provide, to the one or more bank servers, an indication that the transaction is not to be processed. This may, for example, cause a payment of the user to be declined, prevent the transaction from being completed in some manner, and/or the like.

In some implementations, the transaction management platform may cause the recording to be stored in association with transaction data that identifies a list of transactions that have been made using the account of the user. For example, the transaction management platform may cause a data structure to store the recording such that the user may search for the recording via a search feature of the transaction management tool, may listen to the recording via the transaction management tool, may download the recording via the transaction management tool, and/or the like. In some implementations, recording may be used to allow for post-transaction review of a transaction, which may be done with or without using the recording to determine whether to process the transaction. For example, the transaction can be processed by the financial institution like any other transaction, and the recording can be used to manage the account as a memory, to flag a transaction for review, and/or the like. In some implementations, the recording may be transcribed and/or analyzed for transaction characteristics (e.g., information describing the transaction, such as a purchased item or service, a merchant, a transaction amount, a date, a time, and/or the like). The recording may be automatically linked to a corresponding transaction based on comparing actual transaction characteristics and transaction characteristics determined from the recording.

As an example, the transaction management platform may store the converted text data as a transcript of the recording and may cause the search feature of the transaction management tool to be updated in a manner that allows the user to search for the recording by inputting keywords into the search feature. As a particular example, if the user is purchasing a laptop computer for his or her grandson, the user may create a recording stating that the laptop computer has been purchased for $1,200 and that the laptop is a gift for his or her grandson. Consequently, keywords "laptop" and "grandson" may be stored in association with the recording (and/or the transcript of the recording), such that the user may be able to input the keywords into the search feature to cause the search feature of the transaction management tool to locate the recording for the user.

As shown by reference number 170, the user device may access the recording via one or more interfaces of the transaction management tool. For example, an interface of the transaction management tool may be used to display a list of transactions made by the user and may display an indicator, associated with each respective transaction, that indicates whether a recording has been created for each transaction. In this case, the user may interact with the interface (e.g., by clicking on or selecting the indicator, by clicking on a transaction identifier for the transaction, and/or the like) to select the recording. This may cause the recording to be played for the user, may allow the user to download the recording, may display a transcript of the recording, and/or the like.

In some implementations, the transaction management platform may update a list of types of transactions that require recordings, such that subsequent transactions made that share the same transaction type will require the user to create a recording. For example, if the one or more risk scores fail to satisfy the one or more threshold risk scores (e.g., the one or more risk scores correspond to a high risk of the transaction being fraudulent), the transaction management platform may update a list of types of transactions that require recordings, such that subsequent transactions made that share the same transaction type will require the user to create a recording. In this way, the transaction management platform ensures that the user is required to create a recording for transactions that may be identified as having a threshold likelihood of being fraudulent transactions.

In this way, the transaction management platform provides the user with a mechanism for efficiently and/or effectively managing and/or tracking the transaction. For example, by determining whether to permit the transaction to be processed based on verifying that the individual identified in the recording is in fact the user that has the account and/or based on the one or more risk scores, the transaction management platform reduces a risk of the user falling victim to fraud, conserves resources of one or more other devices (e.g., processing resources, network resources, memory resources, and/or the like) that might otherwise be wasted performing fraud correction tasks, and/or the like.

As indicated above, FIGS. 1A-1E are provided as one or more examples. Other examples may differ from what is described with regard to FIGS. 1A-1E.

Figure 2:
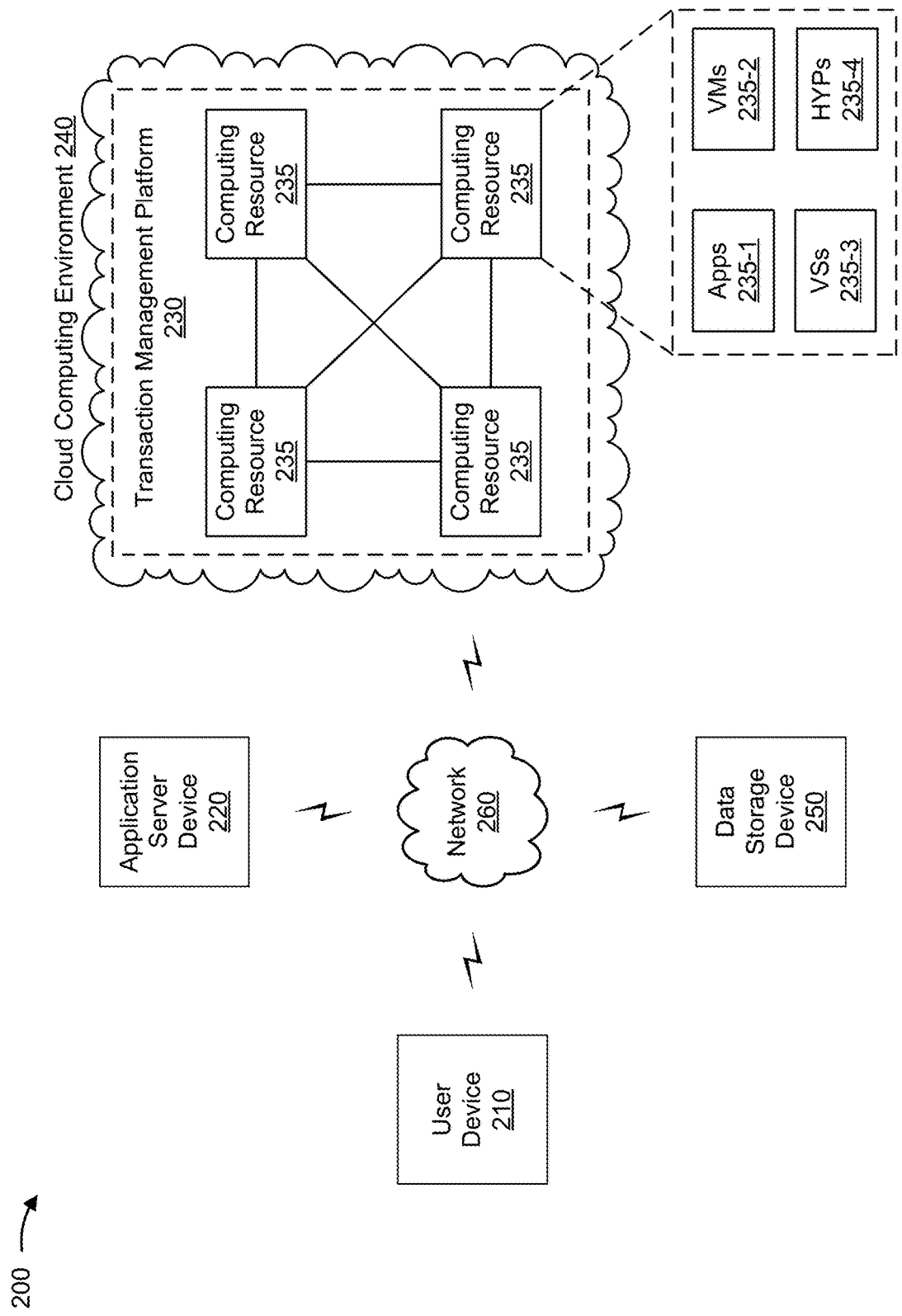
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, an application server device 220, a transaction management platform 230 supported by a cloud computing environment 240, a data storage device 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a recording. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device.

In some implementations, user device 210 may include a camera for creating a recording of the user while the user is describing a transaction. In some implementations, user device 210 may provide the recording to application server device 220 and/or transaction management platform 230 (e.g., using one or more communication interfaces, such as one or more application programming interfaces (APIs) and/or other types of interfaces). In some implementations, user device 210 may host, support, and/or have access to an application used to manage an account of a user (e.g., referred to herein as a transaction management tool). In some implementations, user device 210 may display one or more interfaces of the transaction management tool, such as an interface that allows the recording to be uploaded by the user, an interface that allows the recording to be subsequently played by the user (e.g., at a later time), an interface that allows the recording to be downloaded by the user, an interface that allows the recording to be stored in association with transaction data and/or account data, and/or the like.

Application server device 220 includes one or more devices capable of receiving, storing, generating, determining, and/or providing information associated with a recording. For example, application server device 220 may include a server device or a group of server devices. In some implementations, application server device 220 may host and/or support the transaction management tool. In some implementations, application server device 220 may receive the recording from user device 210 and/or transaction management platform 230.

Transaction management platform 230 includes one or more devices capable of receiving, storing, generating, determining, and/or providing information associated with a recording. For example, transaction management platform 230 may include a server device (e.g., a host server, a web server, an application server, etc.), a data center device, or a similar device. In some implementations, transaction management platform 230 may receive an indication that a transaction involving the user is to be processed. In some implementations, transaction management platform 230 may provide a request for a recording to user device 210. In some implementations, transaction management platform 230 may receive recording data, for the recording, from user device 210. In some implementations, transaction management platform 230 may cause the transaction to be processed or may prevent the transaction from being processed. In some implementations, transaction management platform 230 may cause the recording to be stored (e.g., using a data structure) in association with transaction data for the transaction, in association with account data for the account of the user, and/or the like.

In some implementations, as shown, transaction management platform 230 may be hosted in cloud computing environment 240. While implementations described herein describe transaction management platform 230 as being hosted in cloud computing environment 240, in some implementations, transaction management platform 230 may be non-cloud-based (i.e., may be implemented outside of a cloud computing environment) or may be partially cloud-based.

Cloud computing environment 240 includes an environment that hosts transaction management platform 230. Cloud computing environment 240 may provide computation, software, data access, storage, etc. services that do not require end-user knowledge of a physical location and configuration of system(s) and/or device(s) that hosts transaction management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host transaction management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, application server device 220, and/or data storage device 250. Application 235-1 may eliminate a need to install and execute the software applications on these devices. For example, application 235-1 may include software associated with transaction management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, application server device 220, and/or data storage device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Data storage device 250 includes one or more devices capable of receiving, storing, generating, determining, and/or providing data associated with a recording. For example, data storage device 250 may include a server device or a group of server devices. In some implementations, one or more data storage devices 250 may store historical data used to train one or more data models, may store a set of recordings that the user has made for particular transactions (e.g., in association with relevant transaction data and/or account data), and/or the like. In some implementations, data stored via the one or more data storage devices 250 may be accessed by user device 210, application server device 220, and/or transaction management platform 230 using one or more communication interfaces (e.g., APIs or other types of communication interfaces).

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
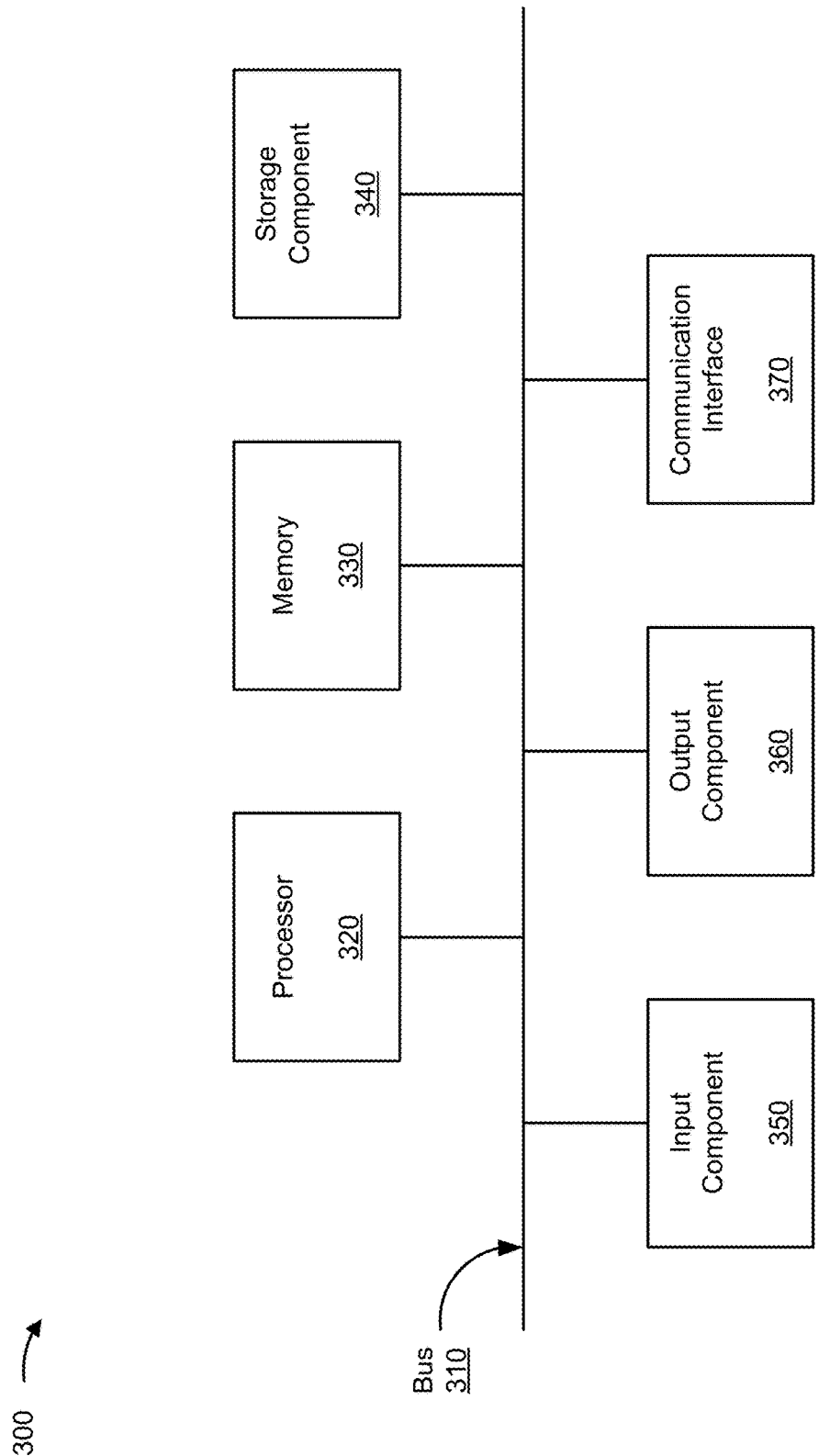
FIG. 3 is a diagram of example components of one or more devices of FIG. 2.

FIG. 3 is a diagram of example components of a device 300. Device 300 may correspond to user device 210, application server device 220, transaction management platform 230, and/or data storage device 250. In some implementations, user device 210, application server device 220, transaction management platform 230, and/or data storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
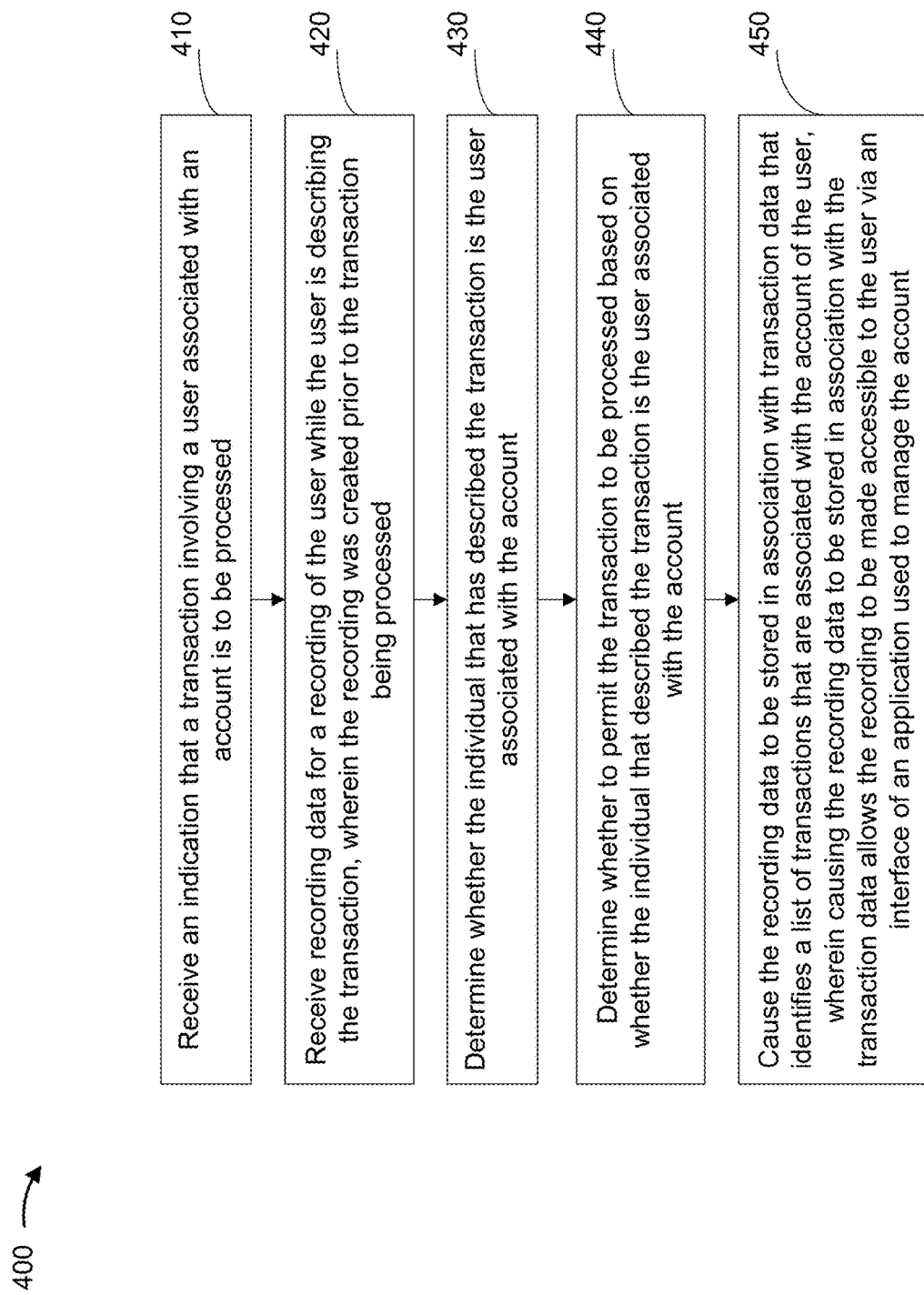

FIG. 4 is a flow chart of an example process 400 for using a diary-like recording tool to determine whether to permit a transaction to be processed. In some implementations, one or more process blocks of FIG. 4 may be performed by a transaction management platform (e.g., transaction management platform 230). In some implementations, one or more process blocks of FIG. 4 may be performed by another device or a group of devices separate from or including the transaction management platform, such as a user device (e.g., user device 210), an application server device (e.g., application server device 220), a data storage device (e.g., data storage device 250), and/or the like.

As shown in FIG. 4, process 400 may include receiving an indication that a transaction involving a user associated with an account is to be processed (block 410). For example, the transaction management platform (e.g., using computing resource 225, processor 320, memory 330, storage component 340, input component 350, communication interface 370, and/or the like) may receive an indication that a transaction involving a user associated with an account is to be processed, as described above.

As further shown in FIG. 4, process 400 may include receiving recording data for a recording of the user while the user is describing the transaction, wherein the recording was created prior to the transaction being processed (block 420). For example, the transaction management platform (e.g., using computing resource 225, processor 320, memory 330, storage component 340, input component 350, communication interface 370, and/or the like) may receive recording data for a recording of the user while the user is describing the transaction, as described above. In some implementations, the recording may have been created prior to the transaction being processed.

As further shown in FIG. 4, process 400 may include determining whether the individual that has described the transaction is the user associated with the account (block 430). For example, the transaction management platform (e.g., using computing resource 225, processor 320, memory 330, storage component 340, and/or the like) may determine whether the individual that has described the transaction is the user associated with the account, as described above.

As further shown in FIG. 4, process 400 may include determining whether to permit the transaction to be processed based on whether the individual that described the transaction is the user associated with the account (block 440). For example, the transaction management platform (e.g., using computing resource 225, processor 320, memory 330, storage component 340, and/or the like) may determine whether to permit the transaction to be processed based on whether the individual that described the transaction is the user associated with the account, as described above.

As further shown in FIG. 4, process 400 may include causing the recording data to be stored in association with transaction data that identifies a list of transactions that are associated with the account of the user, wherein causing the recording data to be stored in association with the transaction data allows the recording to be made accessible to the user via an interface of an application used to manage the account (block 450). For example, the transaction management platform (e.g., using computing resource 225, processor 320, memory 330, storage component 340, input component 350, output component 360, communication interface 370, and/or the like) may cause the recording data to be stored in association with transaction data that identifies a list of transactions that are associated with the account of the user, as described above. In some implementations, causing the recording data to be stored in association with the transaction data may allow the recording to be made accessible to the user via an interface of an application used to manage the account.

Process 400 may include additional implementations, such as any single implementation or any combination of implementations described below and/or in connection with one or more other processes described elsewhere herein.

In a first implementation, when determining whether the individual that described the transaction is the user associated with the account, the transaction management platform may identify one or more characteristics of the individual by using one or more computer vision techniques to process the recording data. Additionally, the transaction management platform may determine whether the one or more characteristics of the individual satisfy a threshold level of similarity with one or more corresponding characteristics of the user associated with the account. Additionally, the transaction management platform may determine whether the individual that described the transaction is the user associated with the account based on determining whether the one or more characteristics of the individual satisfy the threshold level of similarity with the one or more corresponding characteristics of the user associated with the account.

In a second implementation, alone or in combination with the first implementation, the transaction management platform may convert the recording data from video or audio data to text data. Additionally, the transaction management platform may process the text data using one or more natural language processing techniques to identify one or more transaction characteristics that describe the transaction. Additionally, the transaction management platform may provide data that identifies the one or more transaction characteristics as input to a data model that has been trained using machine learning, to cause the data model to output a risk score that indicates a level of risk associated with the transaction. Additionally, the transaction management platform may determine whether to permit the transaction to be processed based on the risk score.

In a third implementation, alone or in combination with one or more of the first and second implementations, the transaction management platform may provide, based on the determining that the one or more transaction characteristics satisfy the one or more configured threshold transaction characteristics, a notification to a device associated with a trustee of the user. The notification may indicate that the trustee is to review the transaction. In some implementations, when determining whether to permit the transaction to be processed, the transaction management platform may determine whether to permit the transaction to be processed based on receiving an indication that the trustee has reviewed or approved the transaction.

In a fourth implementation, alone or in combination with one or more of the first through third implementations, the transaction management platform may provide a notification to a device associated with a trustee of the user based on determining not to permit the transaction to be processed. The notification may indicate to the trustee that the transaction has not been reviewed or approved.

In a fifth implementation, alone or in combination with one or more of the first through fourth implementations, the transaction management platform may convert the recording data from video or audio data to text data. Additionally, the transaction management platform may process the text data using one or more natural language processing techniques to identify a set of terms that describe the transaction. In some implementations, when causing the recording data to be stored in association with the transaction data the transaction management platform may cause the set of terms to be stored in association with the transaction data in a manner that allows the user to locate the recording via a keyword search feature that is part of the application that is used to manage the account.

In a sixth implementation, alone or in combination with one or more of the first through fifth implementations, the transaction management platform may determine, after receiving the indication that the transaction is to be processed, that the transaction cannot be processed unless the recording, which corresponds to the transaction, has been received. Additionally, the transaction management platform may cause, based on determining that the transaction requires the recording, a prompt indicating to submit the recording to be displayed via one or more interfaces. In some implementations, when receiving the recording data, the transaction management platform may receive the recording data based on the user interacting with the interface to submit the recording.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
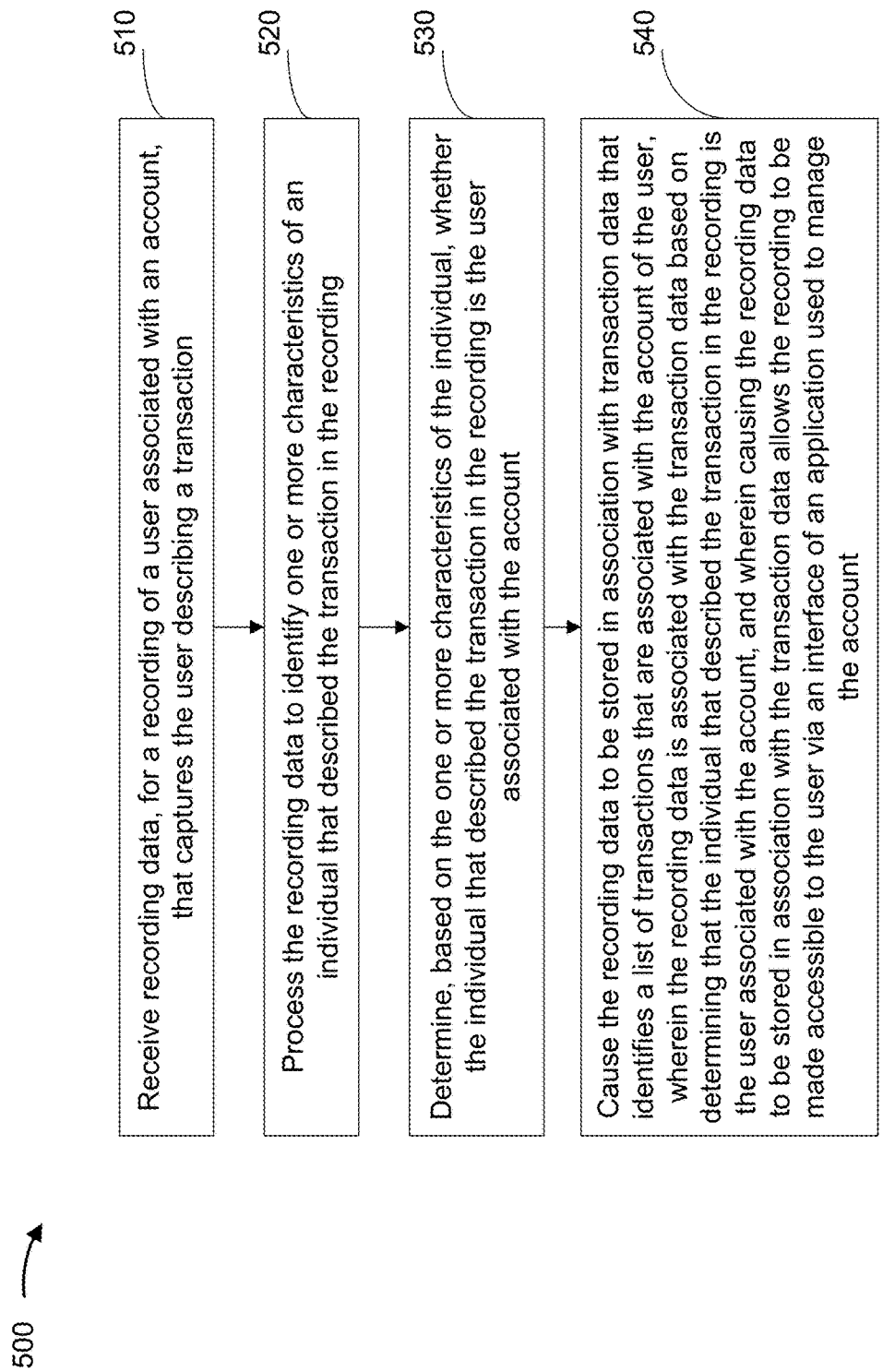

FIG. 5 is a flow chart of an example process 500 for using a diary-like recording tool to determine whether to permit a transaction to be processed. In some implementations, one or more process blocks of FIG. 5 may be performed by a transaction management platform (e.g., transaction management platform 230). In some implementations, one or more process blocks of FIG. 5 may be performed by another device or a group of devices separate from or including the transaction management platform, such as a user device (e.g., user device 210), an application server device (e.g., application server device 220), a data storage device (e.g., data storage device 250), and/or the like.

As shown in FIG. 5, process 500 may include receiving recording data, for a recording of a user associated with an account, that captures the user describing a transaction (block 510). For example, the transaction management platform (e.g., using computing resource 225, processor 320, memory 330, storage component 340, input component 350, communication interface 370, and/or the like) may receive recording data, for a recording of a user associated with an account, that captures the user describing a transaction, as described above.

As further shown in FIG. 5, process 500 may include processing the recording data to identify one or more characteristics of an individual that described the transaction in the recording (block 520). For example, the transaction management platform (e.g., using computing resource 225, processor 320, memory 330, storage component 340, and/or the like) may process the recording data to identify one or more characteristics of an individual that described the transaction in the recording, as described above.

As further shown in FIG. 5, process 500 may include determining, based on the one or more characteristics of the individual, whether the individual that described the transaction in the recording is the user associated with the account (block 530). For example, the transaction management platform (e.g., using computing resource 225, processor 320, memory 330, storage component 340, and/or the like) may determine, based on the one or more characteristics of the individual, whether the individual that described the transaction in the recording is the user associated with the account, as described above.

As further shown in FIG. 5, process 500 may include causing the recording data to be stored in association with transaction data that identifies a list of transactions that are associated with the account of the user, wherein the recording data is associated with the transaction data based on determining that the individual that described the transaction in the recording is the user associated with the account, and wherein causing the recording data to be stored in association with the transaction data allows the recording to be made accessible to the user via an interface of an application used to manage the account (block 540). For example, the transaction management platform (e.g., using computing resource 225, processor 320, memory 330, storage component 340, input component 350, output component 360, communication interface 370, and/or the like) may cause the recording data to be stored in association with transaction data that identifies a list of transactions that are associated with the account of the user, as described above. In some implementations, the recording data may be associated with the transaction data based on determining that the individual that described the transaction in the recording is the user associated with the account. In some implementations, causing the recording data to be stored in association with the transaction data may allow the recording to be made accessible to the user via an interface of an application used to manage the account.

Process 500 may include additional implementations, such as any single implementation or any combination of implementations described below and/or in connection with one or more other processes described elsewhere herein.

In a first implementation, the transaction management platform may determine whether to permit the transaction to be processed based on whether the individual that described the transaction is the user associated with the account.

In a second implementation, alone or in combination with the first implementation, the transaction management platform may identify a device identifier associated with a user device used to generate the recording. Additionally, the transaction management platform may determine, based on the device identifier, that the user device used to generate the recording is linked to the account of the user. Additionally, the transaction management platform may determine whether to permit the transaction to be processed based on whether the individual that described the transaction is the user associated with the account, and based on determining that the user device is linked to the account of the user.

In a third implementation, alone or in combination with one or more of the first and second implementations, the transaction management platform may convert the recording data from video or audio data to text data. Additionally, the transaction management platform may process the text data using one or more natural language processing techniques to identify one or more transaction characteristics that describe the transaction. Additionally, the transaction management platform may provide data that identifies the one or more transaction characteristics as input to a data model that has been trained using machine learning, to cause the data model to output a risk score that indicates a level of risk associated with the transaction. Additionally, the transaction management platform may determine whether to permit the transaction to be processed based on the risk score.

In a fourth implementation, alone or in combination with one or more of the first through third implementations, the transaction management platform may convert the recording data from video or audio data to text data. Additionally, the transaction management platform may process the text data using one or more natural language processing techniques to identify a set of terms that describe the transaction. In some implementations, when causing the recording data to be stored in association with the transaction data, the transaction management platform may cause the set of terms to be stored in association with the transaction data in a manner that allows the user to locate the recording via a keyword search feature that is part of the application that is used to manage the account.

In a fifth implementation, alone or in combination with one or more of the first through fourth implementations, the transaction management platform may, when determining whether the individual that described the transaction is the user associated with the account, provide data that identifies the one or more characteristics of the individual as input to a data model that has been trained using machine learning, to cause the data model to output a similarity score that represents a level of similarity between the one or more characteristics of the individual and one or more corresponding characteristics of the user associated with the account. Additionally, the transaction management platform may determine, based on the similarity score, whether the individual that described the transaction is the user associated with the account.

In a sixth implementation, alone or in combination with one or more of the first through fifth implementations, the transaction management platform may determine that the transaction cannot be processed unless the recording, which corresponds to the transaction, has been received. Additionally, the transaction management platform may determine, before receiving the recording data, that the recording has not been received. Additionally, the transaction management platform may temporarily prevent the transaction from being processed based on determining that the recording must be received before the transaction is processed and based on determining that the recording has not been received. Additionally, the transaction management platform may cause, based on determining that the transaction cannot be processed unless the recording has been received and based on determining that the recording has not been received, an interface that is accessible to the user to prompt the user to submit the recording, allow the transaction to be processed based on receiving the recording data for the recording.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for using a diary-like recording tool to determine whether to permit a transaction to be processed. In some implementations, one or more process blocks of FIG. 6 may be performed by a transaction management platform (e.g., transaction management platform 230). In some implementations, one or more process blocks of FIG. 6 may be performed by another device or a group of devices separate from or including the transaction management platform, such as a user device (e.g., user device 210), an application server device (e.g., application server device 220), a data storage device (e.g., data storage device 250), and/or the like.

As shown in FIG. 6, process 600 may include receiving an indication that a transaction involving a user associated with an account is to be processed (block 610). For example, the transaction management platform (e.g., using computing resource 225, processor 320, memory 330, storage component 340, input component 350, communication interface 370, and/or the like) may receive an indication that a transaction involving a user associated with an account is to be processed, as described above.

As further shown in FIG. 6, process 600 may include receiving recording data for a recording that captures an individual who has described a transaction that has been processed (block 620). For example, the transaction management platform (e.g., using computing resource 225, processor 320, memory 330, storage component 340, input component 350, communication interface 370, and/or the like) may receive recording data for a recording that captures an individual who has described a transaction that has been processed, as described above.

As further shown in FIG. 6, process 600 may include converting the recording data from video or audio data to text data (block 630). For example, the transaction management platform (e.g., using computing resource 225, processor 320, memory 330, storage component 340, and/or the like) may convert the recording data from video or audio data to text data, as described above.

As further shown in FIG. 6, process 600 may include processing the text data using one or more natural language processing techniques to identify one or more transaction characteristics that describe the transaction (block 640). For example, the transaction management platform (e.g., using computing resource 225, processor 320, memory 330, storage component 340, and/or the like) may process the text data using one or more natural language processing techniques to identify one or more transaction characteristics that describe the transaction, as described above.

As further shown in FIG. 6, process 600 may include determining whether to permit the transaction to be processed based on the one or more transaction characteristics that describe the transaction (block 650). For example, the transaction management platform (e.g., using computing resource 225, processor 320, memory 330, storage component 340, and/or the like) may determine whether to permit the transaction to be processed based on the one or more transaction characteristics that describe the transaction, as described above.

As further shown in FIG. 6, process 600 may include causing the recording data to be stored in association with data that identifies at least one transaction characteristic of the one or more transaction characteristics, wherein causing the recording data to be stored in association with the data that identifies at least one transaction characteristic allows the recording to be made accessible to the user via an interface of an application used to manage the account (block 660). For example, the transaction management platform (e.g., using computing resource 225, processor 320, memory 330, storage component 340, input component 350, output component 360, communication interface 370, and/or the like) may cause the recording data to be stored in association with data that identifies at least one transaction characteristic of the one or more transaction characteristics, as described above. In some implementations, causing the recording data to be stored in association with the data that identifies at least one transaction characteristic may allow the recording to be made accessible to the user via an interface of an application used to manage the account.

Process 600 may include additional implementations, such as any single implementation or any combination of implementations described below and/or in connection with one or more other processes described elsewhere herein.

In a first implementation, the transaction management platform may determine whether the individual that described the transaction is the user associated with the account. In some implementations, when determining whether to permit the transaction to be processed, the transaction management platform may determine whether to permit the transaction to be processed based on determining whether the individual that described the transaction is the user associated with the account.

In a second implementation, alone or in combination with the first implementation, when causing the recording data to be stored in association with the data that identifies at least one transaction characteristic, the transaction management platform may cause the data that identifies at least one transaction characteristic, of the one or more transaction characteristics, to be stored in association with the recording data in a manner that allows the user to locate the recording via a keyword search feature that is part of the application that is used to manage the account.

In a third implementation, alone or in combination with one or more of the first and second implementations, the one or more transaction characteristics may include at least one of: a characteristic associated with a price (e.g., an exact price, an approximate price, a price range, and/or the like) for a product or service being exchanged via the transaction, a characteristic associated with a merchant (e.g., a merchant identifier, a merchant classification, such as a type of merchant, and/or the like), a characteristic associated with the product or service (e.g., a product or service identifier, a product or service classification, an identifier of a feature of the product or service, and/or the like), or a characteristic associated with a reason for participating in the transaction.

In a fourth implementation, alone or in combination with one or more of the first through third implementations, when determining whether to permit the transaction to be processed, the transaction management platform may provide data that identifies the one or more transaction characteristics as input to a data model that has been trained using machine learning, to cause the data model to output a risk score that indicates a level of risk associated with the transaction. Additionally, the transaction management platform may determine, based on the risk score, whether to permit the transaction to be processed.

In a fifth implementation, alone or in combination with one or more of the first through fourth implementations, the transaction management platform may provide data that identifies the one or more transaction characteristics as input to a data model that has been trained using machine learning, to cause the data model to output a risk score that indicates a level of risk associated with the transaction. Additionally, the transaction management platform may provide, based on the risk score, a notification to a device associated with a trustee of the user. The notification may indicate that the trustee is to review the transaction. Additionally, the transaction management platform may receive an indication of whether the trustee has approved the transaction. In some implementations, when determining whether to permit the transaction to be processed, the transaction management platform may determine whether to permit the transaction to be processed based on the indication of whether of the trustee has reviewed or approved the transaction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, an indication that a transaction involving a user associated with an account is to be processed;
    receiving, by the device, recording data for a recording of the user while the user is describing the transaction,
        wherein the recording was created prior to the transaction being processed;
    analyzing, by the device, the recording data to determine one or more transaction characteristics that describe the transaction,
        wherein the one or more transaction characteristics that describe the transaction include at least one of:
            a characteristic associated with a price for a product or service being exchanged via the transaction,
            a characteristic associated with a merchant,
            a characteristic associated with the product or service, or
            a characteristic associated with a reason for participating in the transaction;
    training, by the device and based on the recording data, a machine learning model based on historical characteristics of different individuals, including the user, to output a similarity score that indicates a likelihood of a particular individual, of the different individuals, being the user;
    determining, by the device and based on using the machine learning model, whether an individual that has described the transaction is the user associated with the account,
        wherein determining whether the individual that described the transaction is the user associated with the account is based on determining whether one or more characteristics of the individual satisfy a threshold level of similarity with one or more corresponding characteristics of the user associated with the account;
    training, by the device, a neural network model based on historical transaction data to determine a level of risk associated with the transaction based on the one or more transaction characteristics,
        wherein training the neural network model comprises:
            performing a feedforward technique to provide particular historical transaction characteristic values as input to the neural network model;
    determining, by the device, a risk score based on processing the one or more transaction characteristics with the neural network model;
    causing, by the device and based on using the risk score and the similarity score to determine that the individual that has described the transaction is the user associated with the account, the recording data to be stored in association with transaction data that identifies a list of transactions that are associated with the account of the user,
    wherein causing the recording data to be stored in association with the transaction data allows the recording to be made accessible to the user via an interface of an application used to manage the account; and
    linking, by the device, the recording data to a corresponding transaction listed on the list of transactions based on comparing the one or more transaction characteristics that describe the transaction and corresponding transaction characteristics associated with the corresponding transaction,
        wherein the corresponding transaction characteristics that describe the transaction include at least one of:
            a corresponding characteristic associated with the price for the product or service being exchanged via the transaction,
            a corresponding characteristic associated with the merchant,
            a corresponding characteristic associated with the product or service, or
            a corresponding characteristic associated with the reason for participating in the transaction, and
        displaying an indication in association with information indicating the corresponding transaction via the interface to indicate that the recording data has been linked to the transaction.

2. The method of claim 1, wherein determining whether the individual that has described the transaction is the user associated with the account comprises:
    identifying the one or more characteristics of the individual by using one or more computer vision techniques to process the recording data.

3. The method of claim 1, further comprising:
    converting the recording data from video or audio data to text data;
    processing the text data using one or more natural language processing techniques to identify the one or more transaction characteristics that describe the transaction; and
    determining whether to permit the transaction to be processed based on the risk score.

4. The method of claim 3, further comprising:
    providing, based on determining that the one or more transaction characteristics satisfy one or more configured threshold transaction characteristics, a notification to a particular device associated with a trustee of the user,
        wherein the notification indicates that the trustee is to review the transaction; and wherein determining whether to permit the transaction to be processed comprises:
            determining whether to permit the transaction to be processed based on receiving an indication that the trustee has reviewed or approved the transaction.

5. The method of claim 1, further comprising:
    providing a notification to a particular device associated with a trustee of the user based on determining not to permit the transaction to be processed,
        wherein the notification indicates to the trustee that the transaction has not been reviewed or approved.

6. The method of claim 1, further comprising:
    converting the recording data from video or audio data to text data; and
    processing the text data using one or more natural language processing techniques to identify a set of terms that describe the transaction; and
    wherein causing the recording data to be stored in association with the transaction data comprises:
        causing the set of terms to be stored in association with the transaction data in a manner that allows the user to locate the recording via a keyword search feature that is part of the application that is used to manage the account.

7. The method of claim 1, further comprising:
    determining, after receiving the indication that the transaction is to be processed, that the transaction cannot be processed unless the recording, which corresponds to the transaction, has been received;
    causing, based on determining that the transaction requires the recording, a prompt indicating to submit the recording to be displayed via one or more interfaces; and
    wherein receiving the recording data comprises:
        receiving the recording data based on the user interacting with the interface to submit the recording.

8. A device, comprising:
one or more memories; and
one or more processors, communicatively coupled to the one or more memories, configured to:
    receive recording data, for a recording of a user associated with an account, that captures the user describing a transaction;
    process the recording data to identify one or more characteristics of an individual that described the transaction in the recording;
    determine, based on the one or more characteristics of the individual, whether the individual that described the transaction in the recording is the user associated with the account,
        wherein the one or more processors, when determining whether the individual that has described the transaction is the user associated with the account, determine whether the individual that described the transaction is the user associated with the account based on determining whether one or more characteristics of the individual satisfy a threshold level of similarity with one or more corresponding characteristics of the user associated with the account, and
        wherein the one or more processors, to determine the individual that has described the transaction is the user associated with the account, are to use a machine learning model trained based on historical data to identify characteristics of two or more individuals to output a similarity score;
    analyze the recording data to determine one or more transaction characteristics that describe the transaction,
        wherein the one or more transaction characteristics that describe the transaction include at least one of:
            a characteristic associated with a price for a product or service being exchanged via the transaction,
            a characteristic associated with a merchant,
            a characteristic associated with the product or service, or
            a characteristic associated with a reason for participating in the transaction;

train, a neural network model based on historical transaction data to determine a level of risk associated with the transaction based on the one or more transaction characteristics,
  wherein the one or more processors, to train the neural network model, are configured to:
    perform a feedforward technique to provide particular historical transaction characteristic values as input to the neural network model;
determine a risk score based on processing the one or more transaction characteristics with the neural network model;
cause, based on the similarity score and the risk score, the recording data to be stored in association with transaction data that identifies a list of transactions that are associated with the account of the user,
  wherein the recording data is associated with the transaction data based on determining that the individual that described the transaction in the recording is the user associated with the account, and
  wherein causing the recording data to be stored in association with the transaction data allows the recording to be made accessible to the user via an interface of an application used to manage the account; and
link the recording data to a corresponding transaction listed on the list of transactions based on comparing the one or more transaction characteristics that describe the transaction and corresponding transaction characteristics associated with the corresponding transaction,
  wherein the corresponding transaction characteristics that describe the transaction include at least one of:
    a corresponding characteristic associated with the price for the product or service being exchanged via the transaction,
    a corresponding characteristic associated with the merchant,
    a corresponding characteristic associated with the product or service, or
    a corresponding characteristic associated with the reason for participating in the transaction, and
  wherein an indicator is displayed in association with information indicating the corresponding transaction via the interface to indicate that the recording data has been linked to the transaction.

9. The device of claim 8, wherein the one or more processors are further configured to:
  determine whether to permit the transaction to be processed based on whether the individual that described the transaction is the user associated with the account.

10. The device of claim 8, wherein the one or more processors are further to:
  identify a device identifier associated with a user device used to generate the recording;
  determine, based on the device identifier, that the user device used to generate the recording is linked to the account of the user; and
  determine whether to permit the transaction to be processed based on whether the individual that described the transaction is the user associated with the account and based on determining that the user device is linked to the account of the user.

11. The device of claim 8, wherein the one or more processors are further configured to:

convert the recording data from video or audio data to text data;
process the text data using one or more natural language processing techniques to identify the one or more transaction characteristics that describe the transaction;
determine whether to permit the transaction to be processed based on the risk score.

12. The device of claim 8, wherein the one or more processors are further configured to:
  convert the recording data from video or audio data to text data; and
  process the text data using one or more natural language processing techniques to identify a set of terms that describe the transaction; and
  wherein the one or more processors, when causing the recording data to be stored in association with the transaction data, are configured to:
    cause the set of terms to be stored in association with the transaction data in a manner that allows the user to locate the recording via a keyword search feature that is part of the application that is used to manage the account.

13. The device of claim 8, wherein the one or more processors, when determining whether the individual that described the transaction is the user associated with the account, are configured to:
  provide data that identifies the one or more characteristics of the individual as input to a data model that has been trained using machine learning, to cause the data model to output the similarity score that represents a level of similarity between the one or more characteristics of the individual and the one or more corresponding characteristics of the user associated with the account, and
  determine, based on the similarity score, whether the individual that described the transaction is the user associated with the account.

14. The device of claim 8, wherein the one or more processors are further configured to:
  determine that the transaction cannot be processed unless the recording, which corresponds to the transaction, has been received;
  determine, before receiving the recording data, whether the recording has been received;
  temporarily prevent the transaction from being processed based on determining that the recording must be received before the transaction is processed and based on determining whether the recording has been received;
  cause, based on determining that the transaction cannot be processed unless the recording has been received and based on determining that the recording has not been received, the interface that is accessible to the user to prompt the user to submit the recording,
    wherein causing the interface to prompt the user to submit the recording causes the recording to be submitted and provided to the one or more processors; and
  allow the transaction to be processed based on receiving the recording data for the recording.

15. A non-transitory computer-readable medium storing instructions, the instructions comprising:
  one or more instructions that, when executed by one or more processors of a device, cause the one or more processors to:
    receive an indication that a transaction involving a user associated with an account is to be processed;

receive recording data for a recording that captures an individual describing the transaction;
convert the recording data from video or audio data to text data;
process the text data using one or more natural language processing techniques to identify one or more transaction characteristics that describe the transaction,
 wherein the one or more transaction characteristics that describe the transaction include at least one of:
  a characteristic associated with a price for a product or service being exchanged via the transaction,
  a characteristic associated with a merchant,
  a characteristic associated with the product or service, or
  a characteristic associated with a reason for participating in the transaction;
determine, based on analyzing the recording data, whether an individual that described the transaction in the recording is the user associated with the account,
 wherein the one or more instructions that cause the one or more processors to determine whether the individual that has described the transaction is the user associated with the account, cause the one or more processors to determine whether the individual that described the transaction is the user associated with the account based on determining whether one or more characteristics of the individual satisfy a threshold level of similarity with one or more corresponding characteristics of the user associated with the account, and
 wherein the one or more instructions, that cause the one or more processors to determine the individual that has described the transaction is the user associated with the account, cause the one or more processors to use a machine learning model trained based on historical data to identify characteristics of two or more individuals to output a similarity score;
train, a neural network model based on historical transaction data to determine a level of risk associated with the transaction based on the one or more transaction characteristics,
 wherein the one or more instructions, that cause the one or more processors to train the neural network model, cause the one or more processors to:
  perform a feedforward technique to provide particular historical transaction characteristic values as input to the neural network model;
determine a risk score based on processing the one or more transaction characteristics with the neural network model;
determine, based on the similarity score and the risk score, whether to permit the transaction to be processed based on the one or more transaction characteristics that describe the transaction;
cause the recording data to be stored in association with data that identifies at least one transaction characteristic of the one or more transaction characteristics,
 wherein causing the recording data to be stored in association with the data that identifies at least one transaction characteristic allows the recording to be made accessible to the user via an interface of an application used to manage the account; and
link the recording data to a corresponding transaction listed on a list of transactions based on comparing the one or more transaction characteristics that describe the transaction and corresponding transaction characteristics associated with the corresponding transaction,
 wherein the corresponding transaction characteristics that describe the transaction include at least one of:
  a corresponding characteristic associated with the price for the product or service being exchanged via the transaction,
  a corresponding characteristic associated with the merchant,
  a corresponding characteristic associated with the product or service, or
  a corresponding characteristic associated with the reason for participating in the transaction, and
 wherein an indicator is displayed in association with information indicating the corresponding transaction via the interface to indicate that the recording data has been linked to the transaction.

16. The non-transitory computer-readable medium of claim 15,
 wherein the one or more instructions, that cause the one or more processors to determine whether to permit the transaction to be processed, cause the one or more processors to:
  determine whether to permit the transaction to be processed based on determining whether the individual that described the transaction is the user associated with the account.

17. The non-transitory computer-readable medium of claim 15, wherein the one or more instructions, that cause the one or more processors to cause the recording data to be stored in association with the data that identifies at least one transaction characteristic, cause the one or more processors to:
 cause the data that identifies at least one transaction characteristic, of the one or more transaction characteristics, to be stored in association with the recording data in a manner that allows the user to locate the recording via a keyword search feature that is part of the application that is used to manage the account.

18. The non-transitory computer-readable medium of claim 15, wherein the one or more instructions, that cause the one or more processors to determine whether to permit the transaction to be processed, cause the one or more processors to:
 determine, based on the risk score, whether to permit the transaction to be processed.

19. The non-transitory computer-readable medium of claim 15, wherein the one or more instructions, when executed by the one or more processors, further cause the one or more processors to:
 provide, based on the risk score, a notification to a device associated with a trustee of the user,
  wherein the notification indicates that the trustee is to review the transaction;
 receive an indication of whether the trustee has approved the transaction; and
 determine whether to permit the transaction to be processed based on the indication of whether the trustee has reviewed or approved the transaction.

20. The non-transitory computer-readable medium of claim 15, wherein the one or more instructions, when executed by the one or more processors, further cause the one or more processors to:
   identify one or more missing transaction characteristics that are not identified in the recording data; and
   cause a user device to display a notification that the user is to submit a supplemental recording that includes the one or more missing transaction characteristics.

* * * * *